(12) United States Patent
Lee et al.

(10) Patent No.: US 9,243,616 B2
(45) Date of Patent: Jan. 26, 2016

(54) HEAT-ELECTRICITY COMBINED PRODUCTION SYSTEM THAT UTILIZES SOLAR ENERGY AND GEOTHERMAL HEAT

(71) Applicant: Korea Institute of Energy Research, Daejeon (KR)

(72) Inventors: Euy-Joon Lee, Chungcheongnam-Do (KR); Eun-Chul Kang, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 218 days.

(21) Appl. No.: 14/071,481

(22) Filed: Nov. 4, 2013

(65) Prior Publication Data

US 2014/0123644 A1 May 8, 2014

(30) Foreign Application Priority Data

Nov. 2, 2012 (KR) .......................... 10-2012-123683

(51) Int. Cl.
| | | |
|---|---|---|
| *F03G 7/00* | (2006.01) | |
| *B60K 16/00* | (2006.01) | |
| *F01K 13/00* | (2006.01) | |
| *F03G 7/04* | (2006.01) | |
| *F03G 6/00* | (2006.01) | |
| *F25B 27/00* | (2006.01) | |
| *F25B 30/06* | (2006.01) | |

(52) U.S. Cl.
CPC .. *F03G 7/04* (2013.01); *F03G 6/00* (2013.01); *F25B 27/002* (2013.01); *F25B 30/06* (2013.01); *Y02E 10/10* (2013.01); *Y02E 10/40* (2013.01)

(58) Field of Classification Search
CPC ............. F03G 7/04; F03G 6/00; F25B 30/06; F25B 27/002; Y02E 10/40; Y02E 10/10
USPC ............. 60/676, 641.2–641.4, 641.8–641.15; 62/235.1, 260, 324.1
See application file for complete search history.

(56) References Cited

U.S. PATENT DOCUMENTS

| | | | | |
|---|---|---|---|---|
| 4,158,291 A * | 6/1979 | Jones | ......................... | 60/641.1 |
| 4,516,402 A * | 5/1985 | Chang | ......................... | 60/656 |
| 5,272,879 A * | 12/1993 | Wiggs | ......................... | 60/676 |
| 6,981,377 B2 * | 1/2006 | Vaynberg et al. | ............ | 60/641.8 |
| 8,393,153 B2 * | 3/2013 | Wolter | ......................... | 60/675 |
| 8,561,407 B2 * | 10/2013 | Sines | ......................... | 60/641.8 |
| 8,733,429 B2 * | 5/2014 | Harrison et al. | .............. | 165/240 |

* cited by examiner

*Primary Examiner* — Hoang Nguyen
(74) *Attorney, Agent, or Firm* — Mintz Levin Cohn Ferris Glovsky and Popeo, P.C.; Kongsik Kim; Colleen H. Witherell

(57) ABSTRACT

A heat-electricity combined production system includes: a solar cell module in which a flow path through which a heat source side heating medium heated by solar heat flows, is formed and which generates electricity by solar light; a geothermal heat exchanger that absorbs geothermal heat through the heat source side heating medium; a heat pump including a heat source side heat exchanger that performs heat-exchange between the heat source side heating medium and a refrigerant and a load side heat exchanger that performs heat-exchange between the refrigerant and a load side heating medium; a controller that control the heat source side heating medium to pass through both the solar cell module and the geothermal heat exchanger; and a plurality of pipes that connect the solar cell module, the geothermal heat exchanger and the heat pump.

18 Claims, 23 Drawing Sheets

HEAT-ELECTRICITY COMBINED PRODUCTION SYSTEM THAT UTILIZES SOLAR ENERGY AND GEOTHERMAL HEAT

CROSS-REFERENCE TO RELATED APPLICATION

This application claims priority to and the benefit of Korean Patent Application No. 10-2012-123683, filed on Nov. 2, 2012, the disclosure of which is incorporated herein by reference in its entirety.

BACKGROUND

1. Field of the Invention

The present invention relates to a heat-electricity combined production system that utilizes solar energy and geothermal heat, and more particularly, to a heat-electricity combined production system that is capable of producing heat and electricity in a combined manner by fusing solar energy and geothermal heat.

2. Discussion of Related Art

Solar energy has characteristics of an energy resource that is close to non-pollution, no noise and infinity and thus is main alternative energy. In particular, the usage of solar energy is increasing due to regulations and a tendency of controlling the usage of a fossil fuel.

As part of the usage of solar energy, there is a solar cell that is manufactured using a specific semiconductor, such as solar silicon, zinc sulfide (ZnS) or gallium arsenide (GaAs), that emits electrons while colliding with photons.

Meanwhile, technology that uses geothermal heat as one new renewable energy has been continuously developed. Geothermal heat is a heat source in which about 47% of solar energy that reaches the earth is stored in the underground through the earth's surface. The temperature under the ground that is close to the earth's surface is about 10° C. to 20° C., and there is no annual large temperature change, and the temperature under the ground of several kilometers is a heat source of about 40° C. to 150° C.

In particular, geothermal heat cannot be used as a primary energy source, however, if geothermal heat is used as a heat pump heat source having high energy efficiency, there is a very high possibility that geothermal heat will be used as building cooling and heating energy.

The development of technology for fusing the above described new renewable energy is recently required. Thus, Korean Patent Laid-open Publication No. 10-2004-0049213 discloses a "Heat Pump System Using Combined Heat Source". The related art discloses technology that includes a solar heat exchanger and a geothermal heat exchanger and heat generated in the solar heat exchanger and the geothermal heat exchanger is used for heating and cooling.

However, according to the related art, since heat is individually transferred from solar heat and geothermal heat and is used, thermal efficiency is not high. In case of a geothermal heat pump system using geothermal heat, when the heat pump system operates for winter heating, a large load is applied to a compressor such that problems of frequent trouble of the compressor and reduction in the lifespan caused thereby may occur. Thus, a structure for fusing solar heat and geothermal heat and a method of reducing a load applied to the compressor in the geothermal heat pump system are needed.

Also, the efficiency of the solar cell depends on the amount of incident light and the temperature of photoelectric cells arranged in a photoelectric cell layer. That is, as the temperature of the photoelectric cells rises, the efficiency of the solar cell is lowered. Thus, related arts related to a solar cell module having a cooling unit have been proposed so as to prevent a high-temperature rise of the temperature of the solar cell. However, in most prior arts, there is a structure in which a single refrigerant is used and the installation of a cooling pipe for a flow path of the refrigerant is complicated.

As part of methods using solar heat, Korean Patent Application No. 2002-28178 discloses a method of using solar heat, whereby a sandwich panel manufactured by injecting a urethane solution or a foaming resin into both metal plates and by hardening the urethane solution or the foaming resin. In the structure using the sandwich panel, an outer wall does not directly contact the outside, and a buffering space as an air layer is obtained so that a temperature difference between the interior and the exterior can be reduced to reduce a heating loss and a part of air heated in the air layer flows into the interior so that heating costs can be partially reduced.

However, in the above prior-art documents, additional power is required to flow heated air into the interior or to drive a blowing fan for discharging air in a separation space. Also, the flow path itself is configured to block the interior and the exterior such that an additional window or unit is required for ventilation.

SUMMARY OF THE INVENTION

The present invention is directed to a heat-electricity combined production system that utilizes solar energy and geothermal heat, in which electricity and heat are produced using solar light, solar heat and geothermal heat so that energy efficiency can be improved.

The present invention is also directed to a heat-electricity combined production system that utilizes solar energy and geothermal heat, in which a heating medium that absorbs both solar heat and geothermal heat flows into a geothermal heat pump so that thermal efficiency can be improved, a load to be applied to a compressor of the geothermal heat pump can be reduced and air is used as a heat source side heating medium so that the system can be implemented with low costs.

The present invention is also directed to a heat-electricity combined production system that utilizes solar energy and geothermal heat, in which heat of a solar cell is efficiently cooled using a simple structure so that efficiency can be improved.

The present invention is also directed to a heat-electricity combined production system that utilizes solar energy and geothermal heat, in which the structure of a heating system including a solar cell module is simplified so that thermal efficiency can be improved and energy can be saved.

According to an aspect of the present invention, there is provided a neat-electricity combined production system using solar energy including: a solar cell module in which a flow path through which a heat source side heating medium heated by solar heat flows, is formed and which generates electricity by solar light; a geothermal heat exchanger that absorbs geothermal heat through the heat source side heating medium; a heat pump including a heat source side heat exchanger that performs heat-exchange between the heat source side heating medium and a refrigerant and a load side heat exchanger that performs heat-exchange between the refrigerant and a load side heating medium; a controller that transfers the heat source side heating medium having temperature fallen due to heat-exchange performed by the heat source side heat exchanger so as to selectively pass through the solar cell module or the geothermal heat exchanger or to pass through both the solar cell module and the geothermal heat exchanger; and a plurality of pipes that connect the solar cell module, the geothermal heat exchanger and the heat pump so that the heat source side heating medium is able to flow through the plurality of pipes.

The heat source side heating medium can be air.

A path on which the heat source side heating medium is circulated, may include solar cell circulation paths that circulate the heat source side heat exchanger and the solar cell module, geothermal heat circulation paths that circulate the heat source side heat exchanger and the geothermal heat exchanger, and combined circulation paths that circulate the heat source side heat exchanger, the solar cell module and the geothermal heat exchanger.

An external condition determination unit for determining an external condition is provided at the controller, and the heat source side heating medium circulates one from among the solar cell circulation paths, the geothermal heat circulation paths and the combined circulation paths based on a determination result of the external condition determination unit.

Pipes that constitute the solar cell circulation paths, the geothermal heat circulation paths and the combined circulation paths comprise a heat pump inlet pipe connected to the heat source side heat exchanger in such a way that the heat source side heating medium flows into the heat source side heat exchanger, a heat pump outlet pipe connected to the heat source side heat exchanger in such a way that the heat source side heating medium flows out from the heat source side heat exchanger, a solar cell inlet pipe diverged from the heat pump outlet pipe and connected to the solar cell module, a solar cell outlet pipe connected to the solar cell module in such a way that the heat source side heating medium flowing into the solar cell module flows out and flows into the heat pump inlet pipe, a geothermal heat inlet pipe diverged from the heat pump outlet pipe and connected to the geothermal heat exchanger, a geothermal heat out et pipe connected to the geothermal heat exchanger in such a way that the heat source side heating medium flowing out from the geothermal heat exchanger flows into the heat pump inlet pipe, and a first connection pipe that allows the heat source side heating medium flowing out through the solar cell outlet pipe to flow into the geothermal heat exchanger through the geothermal heat inlet pipe, and wherein a first flow path conversion unit installed at a point where the heat pump outlet pipe, the solar cell inlet pipe and the geothermal heat inlet pipe cross one another, and a third flow path conversion unit installed at a point where the solar cell outlet pipe and the first connection pipe cross each other, are provided.

A second connection pipe is provided between the solar cell outlet pipe and the heat pump inlet pipe, and a second flow path conversion unit is further provided at a point where the geothermal heat outlet pipe, the second connection pipe and the heat pump inlet pipe cross one another.

Pipes that constitute the solar cell circulation paths, the geothermal heat circulation paths and the combined circulation paths comprise a heat pump inlet pipe connected to the heat source side heat exchanger in such a way that the heat source side heating medium flows into the heat source side heat exchanger, a heat pump outlet pipe connected to the heat source side heat exchanger in such a way that the heat source side heating medium flows out from the heat source side heat exchanger, a solar cell inlet pipe diverged from the heat pump outlet pipe and connected to the solar cell module, a solar cell outlet pipe connected to the solar cell module in such a way that the heat source side heating medium flowing into the solar cell module flows out and flows into the heat pump inlet pipe, a geothermal heat inlet pipe diverged from the heat pump outlet pipe and connected to the geothermal heat exchanger, a geothermal heat outlet pipe connected to the geothermal heat exchanger in such a way that the heat source side heating medium flowing out from the geothermal heat exchanger flows into the heat pump inlet pipe, a third connection pipe that connects the geothermal heat outlet pipe, the solar cell outlet pipe and the heat pump inlet pipe, and a fourth connection pipe that connects the heat pump outlet pipe and the solar cell inlet pipe, and wherein a fourth flow path conversion unit installed at a point where the heat pump outlet pipe, the fourth connection pipe and the geothermal heat inlet pipe cross one another, a fifth flow path conversion unit installed at a point where the solar cell outlet pipe, the heat pump inlet pipe and the third connection pipe cross each other, and a sixth flow path conversion unit installed at a point where the third connection pipe, the solar cell inlet pipe, the geothermal heat outlet pipe and the fourth connection pipe cross one another, are provided.

The external condition is one or more from among outdoor air temperature, time, and the amount of solar radiation, and when the outdoor air temperature is equal to or less than a setting temperature and simultaneously the amount of solar radiation is equal to or less than a setting amount, the heat source side heating medium circulates the combined circulation paths, thereby absorbing both solar heat and geothermal heat.

A heat storage tank configured to store heat of the heat source side heating medium heated by the solar cell module is provided, and heat of the heat storage tank is used for hot water.

The heat pump module is driven using electricity produced in the solar cell module.

The solar cell module may include: a photoelectric layer comprising a solar cell; an insulating layer that faces the photoelectric layer while being spaced apart from the photoelectric layer by a predetermined gap; and a partition member configured to divide a region between the photoelectric layer and the insulating layer into two or more cooling pipes, and wherein the partition member has a bent shape in which a ridge that contacts a bottom surface of the photoelectric layer and a valley that contacts a top surface of the insulating layer are formed.

A plurality of cooling pipes defined by the partition member are configured so that cooling pipes through which a gaseous heating medium flows and cooling pipes through which a liquid heating medium flows, are alternately formed.

According to another aspect of the present invention, there is provided a heat-electricity combined production system using solar energy including: heat collectors installed to be spaced apart from an outer wall of a building by a predetermined gap; a solar cell module which is installed at one side of the heat collectors, through which a heat source side heating medium heated by solar heat flows and which generates electricity by solar light; an inlet hole through which air in a separation space between the outer wall and the heat collectors flows into an interior and which is formed in a top end of the outer wall; a blower fan installed at the inlet hole and connected to the solar cell module; a geothermal heat exchanger that absorbs geothermal heat through the heat source side heating medium; a heat pump including a heat source side heat exchanger that performs heat-exchange between the heat source side heating medium and a refrigerant and a load side heat exchanger that performs heat-exchange between the refrigerant and a load side heating medium; a controller that transfers the heat source side heating medium having temperature fallen due to heat-exchange performed by the heat source side heat exchanger so as to selectively pass through the solar cell module or the geothermal heat exchanger or to pass through both the solar cell module and the geothermal heat exchanger; and a plurality of pipes that connect the solar cell module, the geothermal heat exchanger and the heat pump so that the heat source side heating medium is able to flow through the plurality of pipes.

The solar cell module may include two or more cooling pipes differentiated by a partition member interposed between a photoelectric layer and an insulating layer and having a bent shape in which a ridge and a valley are formed.

The solar cell module may include two or more cooling pipes differentiated by a partition member interposed between the photoelectric layer and the insulating layer and having a rectangular cross-section and including top and bottom ends each having a predetermined width.

The solar cell module may include two or more cooling pipes differentiated by a partition member interposed between the photoelectric layer and the insulating layer and having a triangular cross-section and including upper and lower vertexes.

A partition member that is interposed between the photoelectric layer and the insulating layer and constitutes two or more cooling pipes that differentiate from each other, is provided at the solar cell module, and the cooling pipes defined by the partition member are configured in such a way that cooling pipes through which a liquid heating medium passes and cooling pipes through which a gaseous heating medium passes, are alternately formed.

The heat collectors and the solar cell module are integrated with each other.

A partition member that is interposed between the photoelectric layer and the insulating layer and constitutes two or more cooling pipes through which a liquid heating medium and a gaseous heating medium flow respectively, is provided at the solar cell module, and cooling pipes through which the liquid heating medium passes and cooling pipes through which the gaseous heating medium passes, are provided at the photoelectric layer so as to contact alternately.

The heat collectors may include through holes through which outdoor air flows into the separation space.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
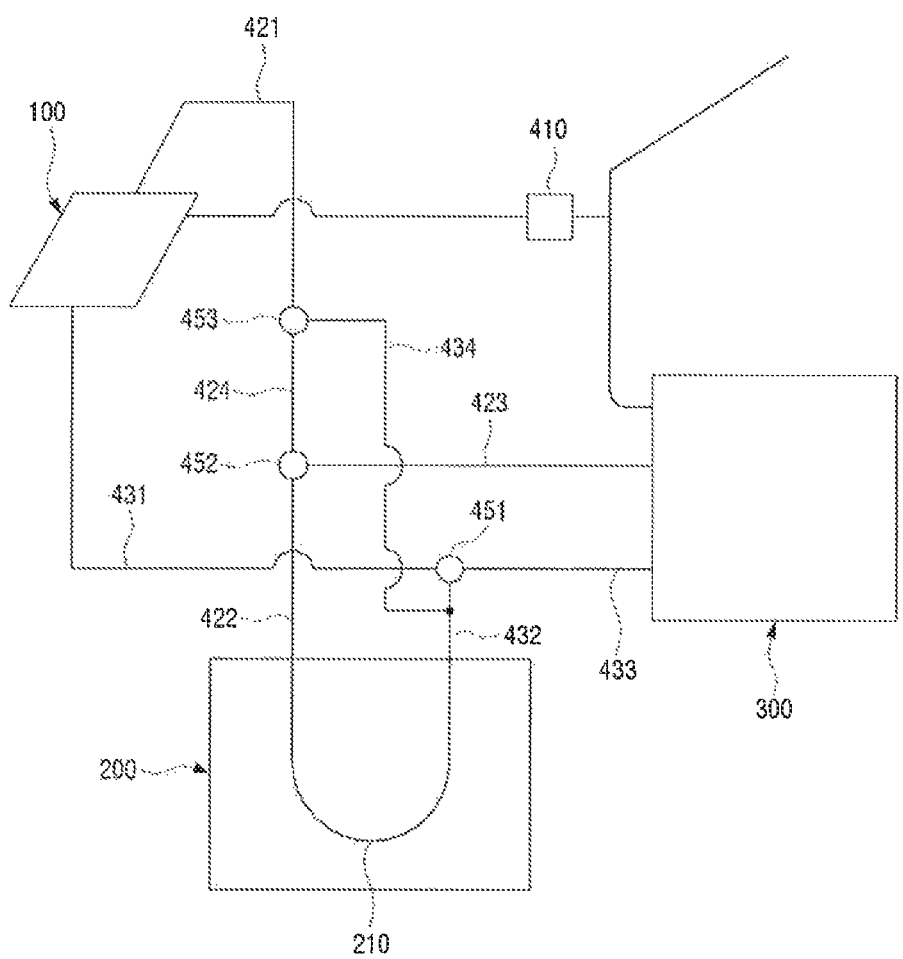
FIG. 1 illustrates a configuration of a heat-electricity combined production system according to an embodiment of the present invention.

Exemplary embodiments of the present invention will be described in detail below with reference to the accompanying drawings. Like reference numerals in the drawings refer to like elements.

Figure 2:
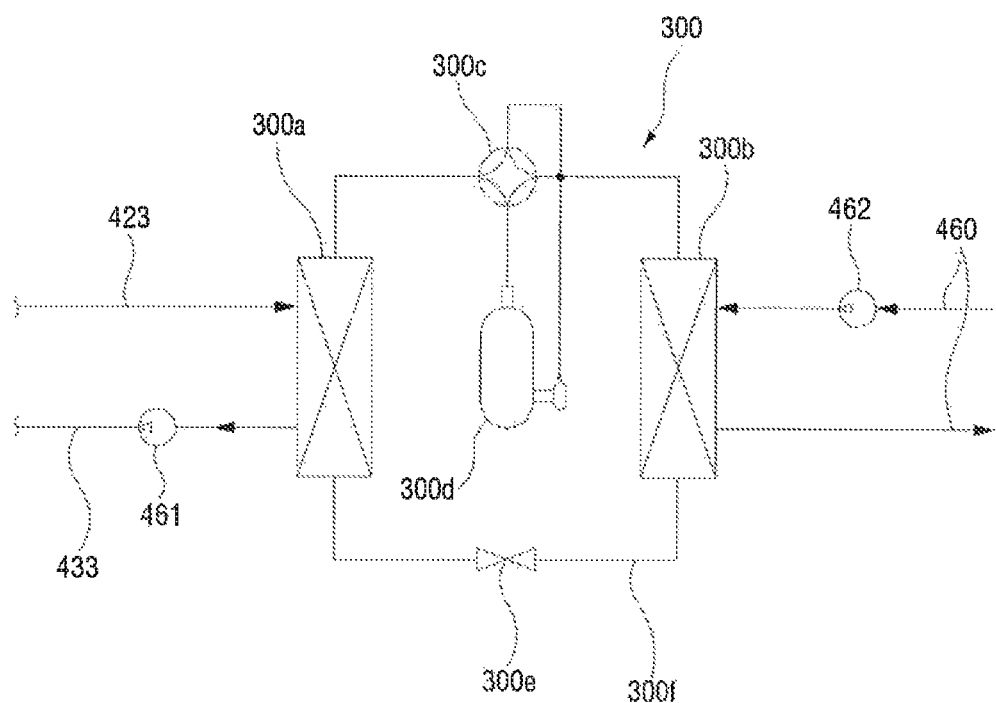
FIG. 2 illustrates a configuration of a heat pump of the heat-electricity combined production system illustrated in FIG. 1.

FIG. 1 illustrates a configuration of a heat-electricity combined production system according to an embodiment of the present invention, and FIG. 2 illustrates a configuration of a heat pump illustrated in the heat-electricity combined production system illustrated in FIG. 1.

The heat-electricity combined production system illustrated in FIG. 1 includes a solar cell module 100 that produces heat by solar heat and produces electricity by solar light, a geothermal heat exchanger 200 that absorbs geothermal heat, a heat pump 300 that transfers heat produced by the solar cell module 100 and heat absorbed by the geothermal heat exchanger 200 to a load side, and a plurality of pipes 421, 422, 423, 424, 432, 432, 433, and 434 which connect the solar cell module 100, the geothermal heat exchanger 200 and the heat pump 300 one another and through which a heating medium flows.

The solar cell module 100 includes a solar cell that produces electricity using solar light and produces heat by heating a neat source side heating medium using solar heat, thereby simultaneously producing heat and electricity.

Direct current electricity produced in the solar cell of the solar cell module 100 may be converted into alternating current electricity through an inverter 410 and then may be transmitted to a power businessman and may be sold or may be used as an electricity source required to drive the heat pump 300.

The heat source side heating medium that absorbs solar heat by the solar cell module 100 is transferred to the heat pump 300, and a heat source side heat exchanger 300a provided at the heat pump 300 performs heat-exchange, thereby supplying thermal energy to the load side.

The geothermal heat exchanger 200 is laid under the ground, absorbs geothermal heat while the heat source side heating medium circulates an inside of the geothermal heat exchanger 200 configured as an U-shaped pipe that is a flow path of the heat source side heating medium, transfers absorbed geothermal heat to the hear pump 300 so that the heat source side heat exchanger 300a of the heat pump 300 performs heat-exchange, thereby supplying thermal energy to the load side.

The heat pump 300 includes the heat source side heat exchanger 300a, a load side heat exchanger 300b, a 4-way valve 300c, a compressor 300d, an expansion valve 300e, and a connection pipe 300f that connects the elements 300a, 300b, 300c, 300d and 300e, as illustrated in FIG. 2. While a refrigerant circulates an inside of the heat pump 300, the heat pump 300 is configured to supply heat generated by the solar cell module 100 that is a heat source and to supply heat generated by the geothermal heat exchanger 200 to the load side. The heat pump 300 recovers heat from the heat source side heating medium while repeatedly circulating a cycle including the heat source side heat exchanger 300a, the load side heat exchanger 300b, the 4-way valve 300c, the compressor 300d, and the expansion valve 300e, thereby transferring heat recovered from a load side heating medium. In this case, the 4-way valve 300c is configured to convert the flow path direction of the refrigerant when cooling and heating is performed.

The compressor 300d has the number of revolutions that varies according to a load factor. When the heat source side heat exchanger 300a performs heat-exchange in a state in which there is a large temperature difference between the refrigerant and the heat source side heating medium, the heat source side heat exchanger 300a sufficiently responds to heat required at the load side, and thus a load to be applied to the compressor 300d is reduced. On the other hand, when the heat source side heat exchanger 300a performs heat-exchange in a state in which there is a small temperature difference between the refrigerant and the heat source side heating medium, the heat source side heat exchanger 300a does not sufficiently respond to heat required at the load side and thus a load to be applied to the compressor 300d is increased.

Thus, according to the present invention, the heat source side heating medium passes through both the solar cell module 100 and the geothermal heat exchanger 200. Thus, the heat source side heating medium in a high temperature state flows into the heat source side heat exchanger 300a so that the load of the compressor 300d can be reduced. That is, the heat source side heating medium may pass the solar cell module 100 or the geothermal heat exchanger 200 selectively. However, when an external environment (outdoor air temperature, the amount of solar radiation, and the like) is an environment in which heat cannot be sufficiently generated in either of the solar cell module 100 and the geothermal heat exchanger 200, the heat source side heating medium passes through both the solar cell module 100 and the geothermal heat exchanger 200 and then the heat source side heating medium in the high temperature state flows into the heat source side heat exchanger 300a so that the load to be applied to the compressor 300d can be reduced and energy efficiency can be improved.

The pipes 423 and 433 and a circulation pipe 461 are connected to the heat source side heat exchanger 300a, and heat generated in the heat source is transferred to the refrigerant of the heat pump 300. A pipe 460 and a circulation pipe 462 through which the load side heating medium for transferring heat transferred from the refrigerant of the heat pump 300 to the load side flows, are connected to the load side heat exchanger 300b.

The heat source side heating medium may be water or air. However, when water is used as a heating medium, high costs are required to circulate the heating medium. However, according to the present invention, air is used as the heating medium so that the heating medium can be circulated with low costs.

Hereinafter, a path on which the heat source side heating medium is circulated in the heat-electricity combined production system of FIG. 1, will be described.

The path on which the heat source side heating medium is circulated, includes solar cell circulation paths 433, 431, 421, 424, and 423 that circulate between the heat source side heat exchanger 300a and the solar cell module 100, geothermal heat circulation paths 433, 432, 210, 422, and 423 that circulate between the heat source side heat exchanger 300a and the geothermal heat exchanger 200, and combined circulation paths 433, 431, 421, 434, 432, 210, 422, and 423 that circulate both the heat source side heat exchanger 300a, the solar cell module 100 and the geothermal heat exchanger 200.

Pipes that constitute the solar cell circulation paths 433, 431, 421, 424, and 423, the geothermal heat circulation paths 433, 432, 210, 422, and 423 and the combined circulation paths 433, 431, 421, 434, 432, 422, and 423, include a heat pump inlet pipe 423 connected to the heat source side heat exchanger 300a in such a way that the heat source side heating medium flows into the heat source side heat exchanger 300a, a heat pump outlet pipe 433 connected to the heat source side heat exchanger 300a in such a way that the heat source side heating medium flowing out from the heat pump inlet pipe 423 passes through the heat source side heat exchanger 300a and flows out toward the outside after heat exchange is performed by the heat source side heat exchanger 300a, a solar cell inlet pipe 431 and a geothermal heat inlet pipe 432 that are diverged from the heat pump outlet pipe 433 and that are respectively connected to the solar cell module 100 and the geothermal heat exchanger 200, a solar cell outlet pipe 421 connected to the solar cell module 100 in such a way that the heat source side heating medium absorbing solar heat from the solar cell module 100 flows into the heat pump inlet pipe 423, a geothermal heat outlet pipe 422 connected to the geothermal heat exchanger 200 in such a way that the heat source side heating medium absorbing geothermal heat from the geothermal heat exchanger 200 flows into the heat pump inlet pipe 423, a first connection pipe 434 that allows the heat source side heating medium passing through the solar cell outlet pipe 421 to flow into the geothermal heat exchanger 200 through the geothermal heat inlet pipe 432, and a second connection pipe 424 that connects the solar cell outlet pipe 421 and the geothermal heat outlet pipe 422.

The first connection pipe 434 is a pipe that allows the neat source side heating medium absorbing solar heat through the solar cell module 100 to flow into the geothermal heat exchanger 200. The first connection pipe 434 connects the solar cell outlet pipe 421 and the geothermal heat inlet pipe 432.

In this case, a first flow path conversion unit 451 installed at a point where the heat pump outlet pipe 433, the solar cell inlet pipe 431 and the geothermal heat inlet pipe 432 cross one another, a second flow path conversion unit 452 installed at a point where the geothermal heat outlet pipe 422, the second connection pipe 424 and the heat pump inlet pipe 423 cross one another, and a third flow path conversion unit 453 installed at a point where the solar cell outlet pipe 421, the first connection pipe 434 and the second connection pipe 424 cross one another, are provided as a configuration for converting the flow path direction of the heat source side heating medium.

According to the present invention, an external condition determination unit for determining an external condition for determining a circulation path of the heat source side heating medium is provided at a controller. Here, the external condition may be one or more from among an outdoor air temperature, time, and the amount of solar radiation. That is, one of heating and cooling is selected by determining the external condition, and even when heating is performed, which one of solar heat and geothermal heat, or both solar heat and geothermal heat is determined by determining the external condition.

Thus, the heat source side heating medium circulates one from among the solar cell circulation paths 433, 431, 421, 424, and 423, the geothermal heat circulation paths 433, 432, 210, 422, and 423, and the combined circulation paths 433, 431, 421, 434, 432, 422, and 423 based on the determination result of the external condition determination unit.

Figure 3:
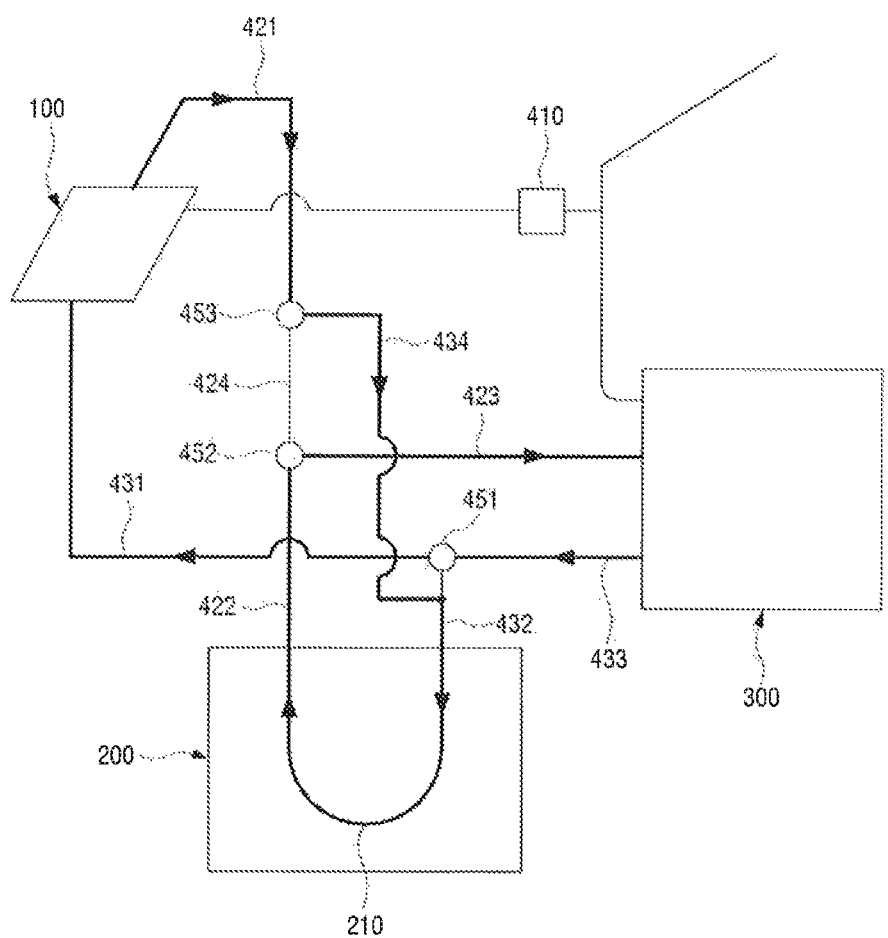
FIG. 3 illustrates a path on which a heating medium sequentially passes through a solar cell module and a geothermal heat exchanger and then flows into a heat pump in the heat-electricity combined production system illustrated in FIG. 1.

FIG. 3 illustrates a path on which a heating medium sequentially passes through the solar cell module 100 and the geothermal heat exchanger 200 and then flows into the heat pump 300 in the heat-electricity combined production system illustrated in FIG. 1. The flow path of the heat source side heating medium will now be described with reference to FIG. 3.

FIG. 3 illustrates the case where solar heat and geothermal heat are simultaneously used. When heating is performed in winter, heating may be performed using only solar heat during the daytime when sunlight exists, however, when it is cloudy, it may not be sufficient to perform only heating using solar heat. Thus, solar heat and geothermal heat may be simultaneously used.

Thus, when it is determined that measured outdoor air temperature is equal to or less than a setting temperature and thus it is winter and when it is determined that the amount of solar radiation is detected to be equal to or less than a setting amount and thus it is cloudy, the heat source side heating medium circulates the combined circulation paths 433, 431, 421, 434, 432, 422, and 423, thereby absorbing both solar heat and geothermal heat.

That is, the heat source side heating medium flowing out from the heat pump 300 flows into the solar cell module 100 via the heat pump outlet pipe 433 and the solar cell inlet pipe 431, and the heat source side heating medium heated by solar heat in the solar cell module 100 flows into the geothermal heat exchanger 200 through the geothermal heat inlet pipe 432 via the solar cell outlet pipe 421 and the first connection pipe 434, and the heat source side heating medium re-heated by geothermal heat in the geothermal heat exchanger 200 flows into the heat source side heat exchanger 300a of the heat pump 300 via the geothermal heat outlet pipe 422 and the heat pump inlet pipe 423 so that heat can be transferred to the load side.

In this case, the first flow path conversion unit 451, the second flow path conversion unit 452 and the third flow path conversion unit 453 may be configured as valves, and flow path directions thereof are set in such a way that the heat source side heating medium may flow on the above-described path.

In this way, the heat source side heating medium circulates the combined circulation paths 433, 431, 421, 434, 432, 422, and 423 and then flows into the heat source side heat exchanger 300a of the heat pump 300 in a state in which the temperature of the heat source side heating medium becomes higher. Thus, a load to be applied to the compressor 300d can be reduced, and thermal energy production efficiency can be further improved.

Figure 4:
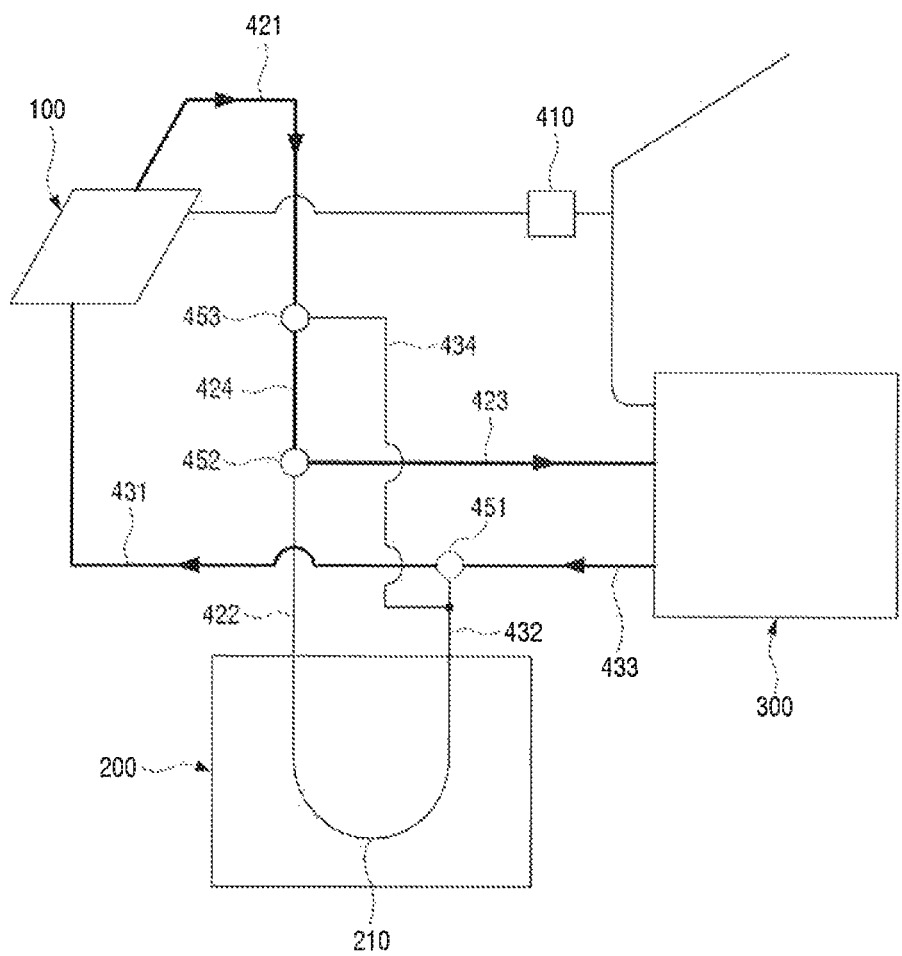
FIG. 4 illustrates a path on which the heating medium passes only through the solar cell module and then flows into the heat pump in the heat-electricity combined production system illustrated in FIG. 1.

FIG. 4 illustrates a path on which the heating medium passes only through the solar cell module 100 and then flows into the heat pump in the heat-electricity combined production system illustrated in FIG. 1. FIG. 4 illustrates the case where only solar heat generated in the solar cell module 100 is used to perform heating in winter.

In this case, the heat source side heating medium flows on the solar cell circulation paths 433, 431, 421, 424, and 423. The heat source side heating medium flowing out from the heat pump 300 through the heat pump outlet pipe 433 flows into the solar cell module 100 through the solar cell inlet pipe 431, and the heat source side heating medium heated by solar heat in the solar cell module 100 flows into the heat source side heat exchanger 300a of the heat pump 300 via the solar cell outlet pipe 421, the second connection pipe 424, and the heat pump inlet pipe 423 so that heat can be transferred to the load side.

In this case, flow path directions of the first flow path conversion unit 451, the second flow path conversion unit 452 and the third flow path conversion unit 453 are set in such a way that the heat source side heating medium may flow on the above described path.

Figure 5:
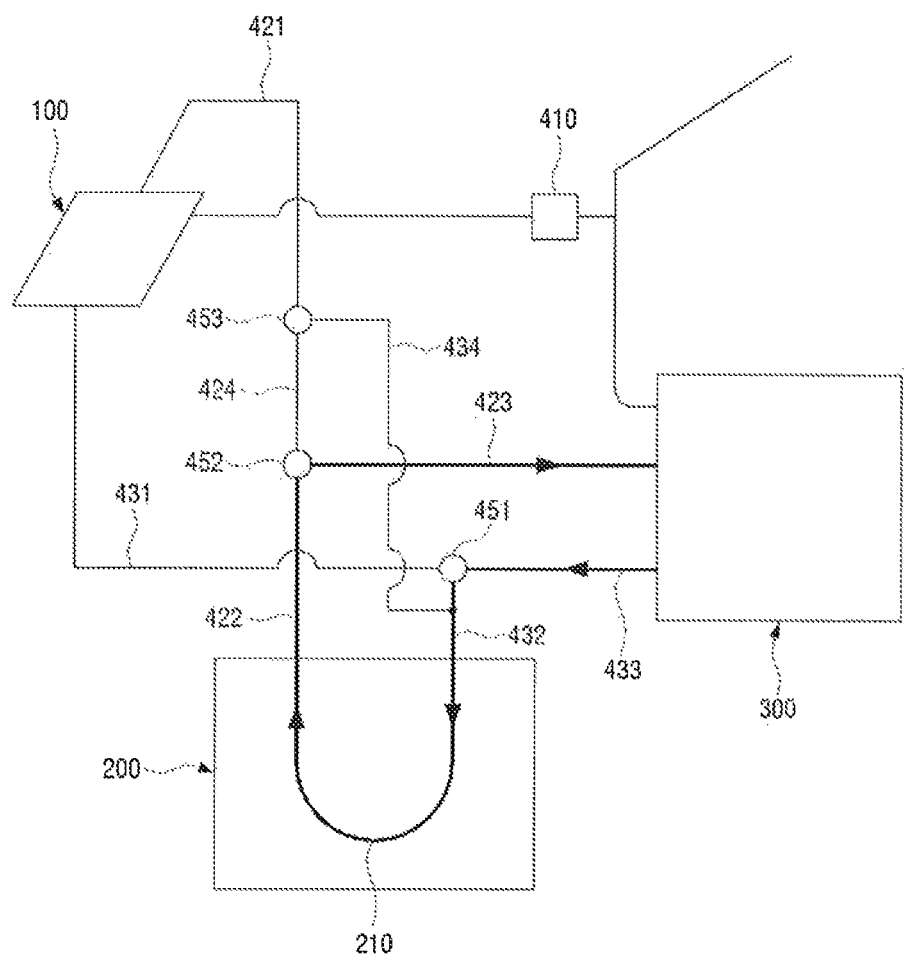
FIG. 5 illustrates a path on which the heating medium passes only through the geothermal heat exchanger and then flows into the heat pump in the heat-electricity combined production system of FIG. 1.

FIG. 5 illustrates a path on which the heating medium passes only through the geothermal heat exchanger 200 and then flows into the heat pump 300 in the heat-electricity combined production system of FIG. 1. FIG. 5 illustrates the case where heating is performed at winter night, the case where cooling is performed using geothermal heat having temperature lower than outdoor air in the summer daytime, and the case where only geothermal heat is used in the geothermal heat exchanger 200.

In this case, the heat source side heating medium flows on the geothermal heat circulation paths 433, 432, 210, 422, and 423. The heat source side heating medium that flows out from the heat pump 300 through the heat pump outlet pipe 433 flows into the geothermal heat exchanger 200 through the geothermal heat inlet pipe 432 and that is heated or cooled by geothermal heat in the geothermal heat exchanger 200, passes through the geothermal heat outlet pipe 422 and the heat pump inlet pipe 423 and flows into the heat source side heat exchanger 300a of the heat pump 300 so that heat can be transferred to the load side.

Figure 6:
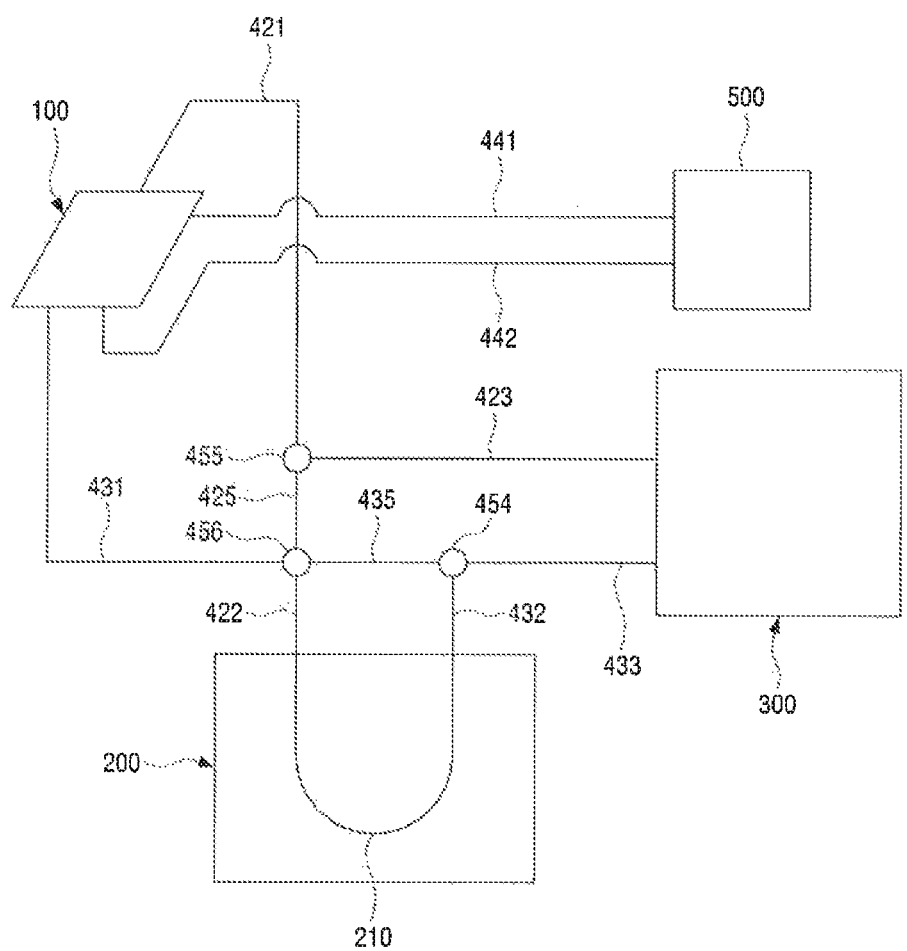
FIG. 6 illustrates a configuration of a heat-electricity combined production system according to another embodiment of the present invention.

FIG. 6 illustrates a configuration of a heat-electricity combined production system according to another embodiment of the present invention.

The heat-electricity combined production system according to another embodiment of the present invention includes a heat pump inlet pipe 423 which is connected to a heat source side heat exchanger 300a and into which a heat source side heating medium flows, a heat pump outlet pipe 433 through which the heat source side heating medium flows out from the heat source side heat exchanger 300a, a solar cell inlet pipe 431 that is diverged from the heat pump outlet pipe 433 and is connected to a solar cell module 100, a solar cell outlet pipe 421 connected to the solar cell module 100 in such a way that the heat source side heating medium absorbing solar heat from the solar cell module 100 flows into the heat pump inlet pipe 423, a geothermal heat inlet pipe 432 which is diverged from the heat pump outlet pipe 433 to be connected to a geothermal heat exchanger 200 and through which the heat source side heating medium flowing out from the heat pump outlet pipe 433 flows, a geothermal heat outlet pipe 422 connected to the geothermal heat exchanger 200 in such a way that the heat source side heating medium flowing out from the geothermal heat exchanger 200 flows into the heat pump inlet pipe 423, a third connection pipe 425 that connects the geothermal heat outlet pipe 422, the solar cell outlet pipe 422 and the heat pump inlet pipe 423, and a fourth connection pipe 435 that connects the heat pump outlet pipe 433 and the solar cell inlet pipe 431.

A fourth flow path conversion unit 454 is provided at a point where the heat pump outlet pipe 433, the fourth connection pipe 435 and the geothermal heat inlet pipe 432 cross one another, and the flow path direction of the fourth flow path conversion unit 454 is set so that the heat source side heating medium flowing out from the heat pump 300 through the heat pump outlet pipe 433 flows into one of the geothermal heat inlet pipe 432 and the fourth connection pipe 435.

Also, a fifth flow path conversion unit 455 is provided at a point where the solar cell outlet pipe 421, the heat pump inlet pipe 423 and the third connection pipe 425 cross one another, and the flow path direction of the fifth flow path conversion unit 455 is set so that the heat source side heating medium supplied from the solar cell outlet pipe 421 flows into the heat pump inlet pipe 423 or the heat source side heating medium supplied through the third connection pipe 425 flows into the heat pump inlet pipe 423.

Also, a sixth flow path conversion unit 456 is provided at a point where the third connection pipe 425, the solar cell inlet pipe 431, the geothermal heat outlet pipe 422 and the fourth connection pipe 435 cross one another, and the flow path direction of the sixth flow path conversion unit 456 is set so that the heat source side heating medium supplied from the fourth connection pipe 435 or the geothermal heat outlet pipe 422 flows into the solar cell inlet pipe 431 or the heat source side heating medium supplied from the geothermal heat outlet pipe 422 flows into the third connection pipe 425.

A heat storage tank 500 may be connected to the solar cell module 100. A flow path on which a second heating medium in addition to a first heating medium that is the above-described heat source side heating medium flows, may be formed in the solar cell module 100, and the second heating medium heated by the solar cell module 100 flows into the heat storage tank 500 through a heat storage tank inlet pipe 441, and the second heating medium cooled by heat-exchange in the heat storage tank 500 may be supplied to the solar cell module 100 through a heat storage tank outlet pipe 442. Heat stored in the heat storage tank 500 may be used for hot water. The first heating medium and the second heating medium are configured to independently flow on independent flow paths provided inside the solar cell module 100, like cooling pipes L and A (see FIG. 14) that will be described below.

Hereinafter, a path on which the heat source side heating medium circulates in the heat-electricity combined production system illustrated in FIG. 6, will be described.

Figure 7:
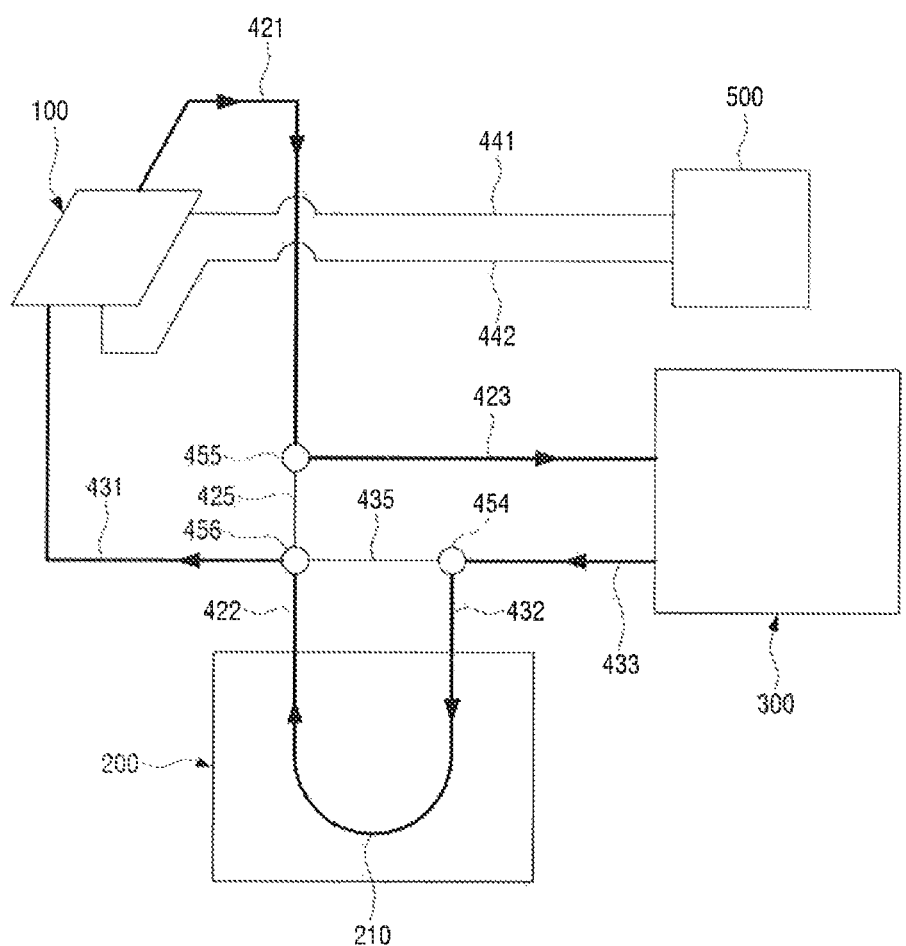
FIG. 7 illustrates a path on which a heating medium sequentially passes through a solar cell module and a geothermal heat exchanger and then flows into a heat pump in the heat-electricity combined production system illustrated in FIG. 6.

FIG. 7 illustrates a path on which a heating medium sequentially passes through the solar cell module 100 and the geothermal heat exchanger 200 and then flows into a heat pump in the heat-electricity combined production system illustrated in FIG. 6, and the flow path of the heat source side heating medium will now be described with reference to FIG. 7.

FIG. 7 illustrates the case where solar heat and geothermal heat are simultaneously used. When it is determined that outdoor air temperature is equal to or less than a setting temperature and thus it is winter and when it is determined that the amount of solar radiation is equal to or less than a setting amount and thus it is cloudy, the heat source side heating medium circulates the combined circulation mediums 433, 432, 210, 422, 431, 421, and 423, thereby absorbing both solar heat and geothermal heat.

That is, the heat source side heating medium flowing out from the heat pump 300 flows into the geothermal heat exchanger 200 via the heat pump outlet pipe 433 and the geothermal heat inlet pipe 432, and the heat source side heating medium heated by geothermal heat in the geothermal heat exchanger 200 flows into the solar cell module 100 via the geothermal heat outlet pipe 422 and the solar cell inlet pipe 431, and the heat source side heating medium heated by solar heat in the solar cell module 100 flows into the heat source side heat exchanger 300*a* of the heat pump 300 via the solar cell outlet pipe 421 and the heat pump inlet pipe 423 so that heat can be transferred to a load side.

In this case, the fourth flow path conversion unit 454, the fifth flow path conversion unit 455 and the sixth flow path conversion unit 456 may be configured as valves, and flow path directions thereof are set in such a way that the heat source side heating medium flows on the above-described flow path.

In this way, the heat source side heating medium circulates the combined circulation paths 433, 432, 210, 422, 431, 421, and 423 and then flows into the heat source side heat exchanger 300*a* of the heat pump 300 in a state in which the temperature of the heat source side heating medium becomes higher. Thus, a load to be applied to the compressor 300*d* can be reduced, and thermal energy production efficiency can be further improved.

Figure 8:
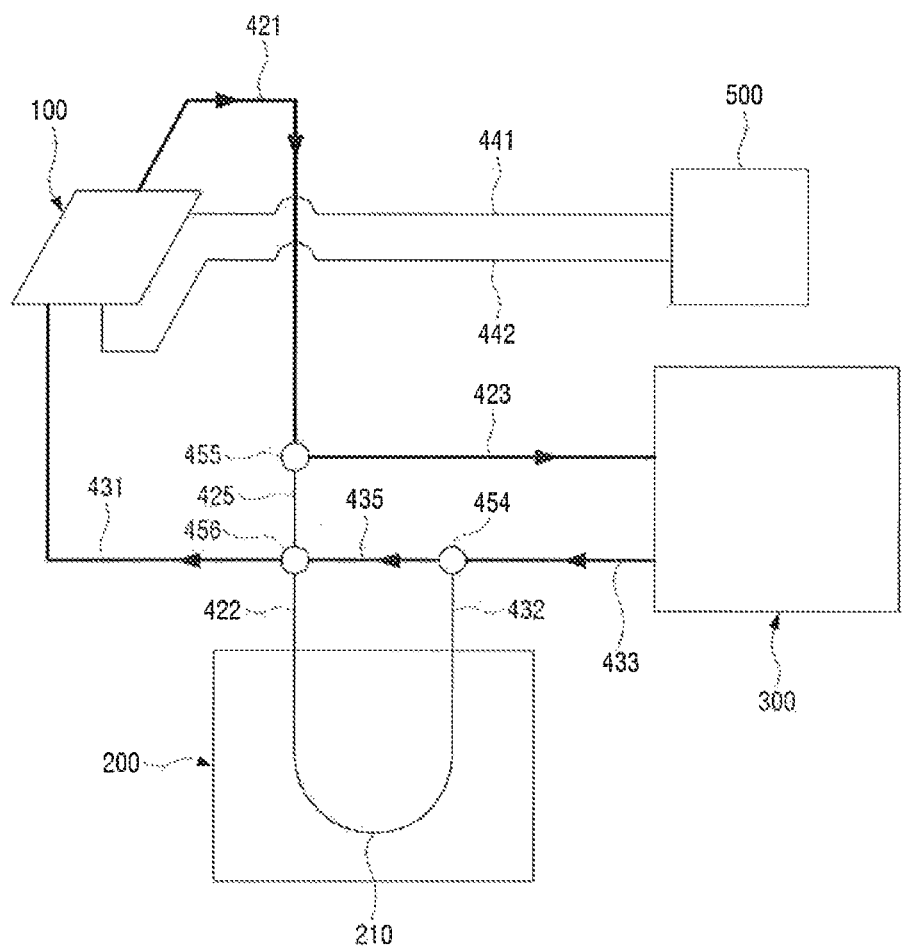
FIG. 8 illustrates a path on which the heating medium passes only through the solar cell module and then flows into the heat pump in the heat-electricity combined production system of FIG. 6.

FIG. 8 illustrates a path on which the heating medium passes only through the solar cell module 100 and then flows into the heat pump 300 in the heat-electricity combined production system of FIG. 6. FIG. 8 illustrates the case where only solar heat is used in the solar cell module 100 so as to perform heating in winter.

In this case, the heat source side heating medium flows on the solar cell circulation paths 433, 435, 431, 421, and 423. The heat source side heating medium flowing out from the heat pump 300 through the heat pump outlet pipe 433 flows into the solar cell module 100 via the fourth connection pipe 435 and the solar cell inlet pipe 431, and the heat source side heating medium heated by solar heat in the solar cell module 100 flows into the heat source side heat exchanger 300*a* of the heat pump 300 via the solar cell outlet pipe 421 and the heat pump inlet pipe 423 so that heat can be transferred to the load side.

In this case, flow path directions of the fourth flow path conversion unit 454, the fifth flow path conversion unit 455 and the sixth flow path conversion unit 456 are set so that the heat source side heating medium flows on the above-described flow path.

Figure 9:
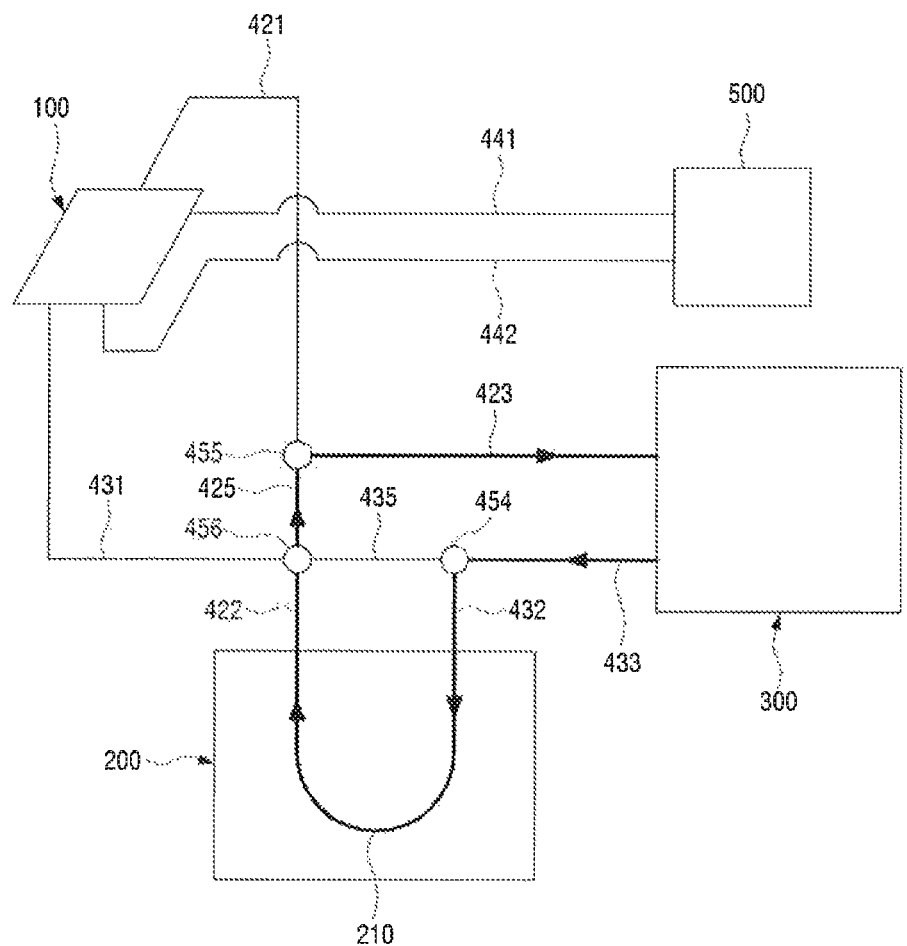
FIG. 9 illustrates a path on which the heating medium passes only through the geothermal heat exchanger and then flows into the heat pump in the heat-electricity combined production system of FIG. 6.

FIG. 9 illustrates a path on which the heating medium passes only through the geothermal heat exchanger 200 and then flows into the heat pump 300 in the heat-electricity combined production system of FIG. 6. FIG. 9 illustrates the case where heating is performed at winter night, the case where cooling is performed in the summer daytime using geothermal heat having temperature lower than outdoor air, and the case where only geothermal heat is used in the geothermal heat exchanger 200.

In this case, the heat source side heating medium flows on the geothermal heat circulation paths 433, 432, 210, 422, 425, and 423. The heat source side heating medium flowing out from the heat pump 300 via the heat pump outlet pipe 433 flows into the geothermal heat exchanger 200 via the geothermal heat inlet pipe 432, and the heat source side heating medium heated or cooled by geothermal heat in the geothermal heat exchanger 200 flows into the heat source side heat exchanger 300*a* of the heat pump 300 via the geothermal heat outlet pipe 422, the third connection pipe 425 and the heat pump inlet pipe 423 so that heat can be transferred to the load side.

Figure 10:
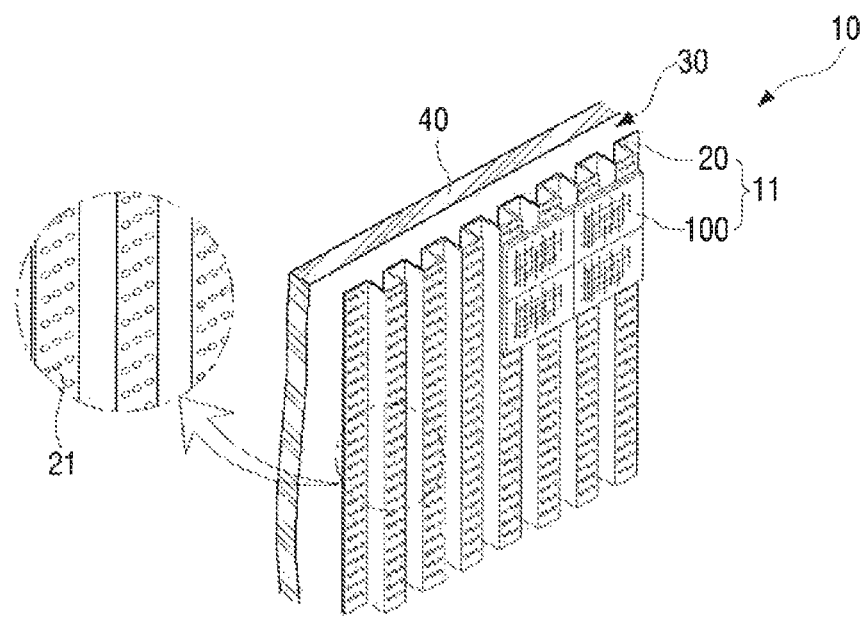
FIG. 10 is a perspective view illustrating a heat-electricity combined production system in which the solar cell module is installed at an outer wall of a building, according to an embodiment of the present invention.
Figure 11:
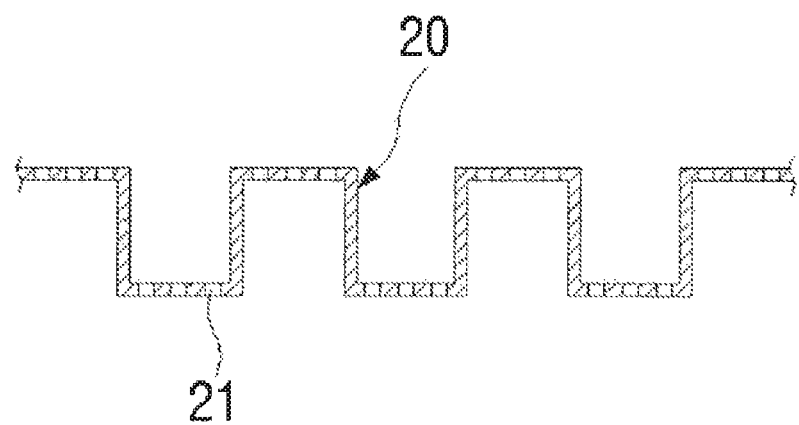
FIG. 11 is a cross-sectional view of heat collectors illustrated in FIG. 10.
Figure 12:
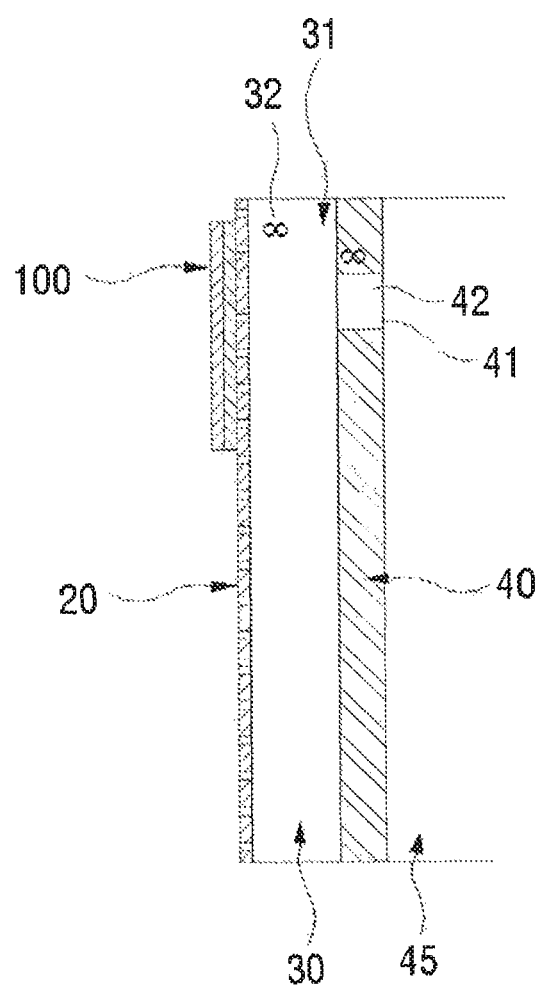
FIG. 12 is a cross-sectional view of the heat-electricity combined production system of FIG. 10.

FIG. 10 is a perspective view illustrating a heat-electricity combined production system in which the solar cell module 100 is installed at an outer wall of a building, according to an embodiment of the present invention, and FIG. 11 is a cross-sectional view of heat collectors illustrated in FIG. 10, and FIG. 12 is a cross-sectional view of the heat-electricity combined production system of FIG. 10.

Referring to FIGS. 10 and 12, the heat-electricity combined production system includes heat collectors 20 that are spaced apart from an outer side of an outer wall 40, and a solar cell module 100 combined with the heat collectors 20. The heat collectors 20 are heated by solar heat and are used to raise the internal temperature of a separation space 30. The heat collectors 20 are formed using a material having good heat generation efficiency. The separation space 30 is formed when the heat collectors 20 are spaced apart from the outer wall 40. In the separation space 30, air is heated by the heat collectors 20.

The heat collectors 20 may have a bent shape so as to increase stress, as illustrated in FIG. 11. The bent shape may be formed by bending a single frame or by combining a plurality of frames in a bent form.

Also, a plurality of through holes 21 through which outdoor air flows into the separation space 30, are formed in the heat collectors 20. The heat collectors 20 may be connected to the outer wall 40 using an auxiliary frame (not shown) so as to form the separation space 30.

An inlet hole 41 through which an interior 45 is connected to the separation space 30, is formed in a state in which the outer wall 40 of the building is placed between the separation space 30 and the interior 45, and a blower fan 42 induces the air in the separation space 30 to flow into the interior 45.

When the heat collectors 20 are heated by solar heat using the above structure in this way, the temperature of the air of the separation space 30 rises, and the air having temperature that rises to a high temperature flows into the interior 45 via the inlet hole 41 disposed at an upper layer part of the heat-electricity combined production system. In this case, the blower fan 42 of the inlet hole 41 assists the air of the separation space 30 to flow into the interior 45. Air from the outside flows into the separation space 30 via the through holes 21.

A discharge hole 31 is formed in an upper part of the separation space 30 so as to discharge air heated in the separation space 30 to the outside. That is, the discharge hole 31 is used to prevent an energy loss from occurring due to a temperature difference between the separation space 30 and the interior 45 that occurs when the air temperature of the separation space 30 raises excessively.

A discharge fan 32 is controlled so that an operation of discharging high-temperature air from the separation space 30 to the outside can be selectively performed. That is, the discharge fan 32 allows the air heated in the separation space 30 to be discharged through the discharge hole 31 only when the air of the separation space 30 has an excessively high temperature, so as to prevent thermal efficiency from being lowered by not allowing the air heated in the separation space 30 not to flow into the interior 45 and to be discharged to the outside.

The solar cell module 100 includes a solar cell that produces electricity using solar energy and is combined with the outer side of the heat collectors 20.

The solar cell module 100 supplies produced electricity to the blower fan 42. Also, the solar cell module 100 cools heat generated in a photoelectric layer, transmits a heating medium heated during a cooling operation to a heat exchanger and uses the heating medium as an energy source.

Figure 13:
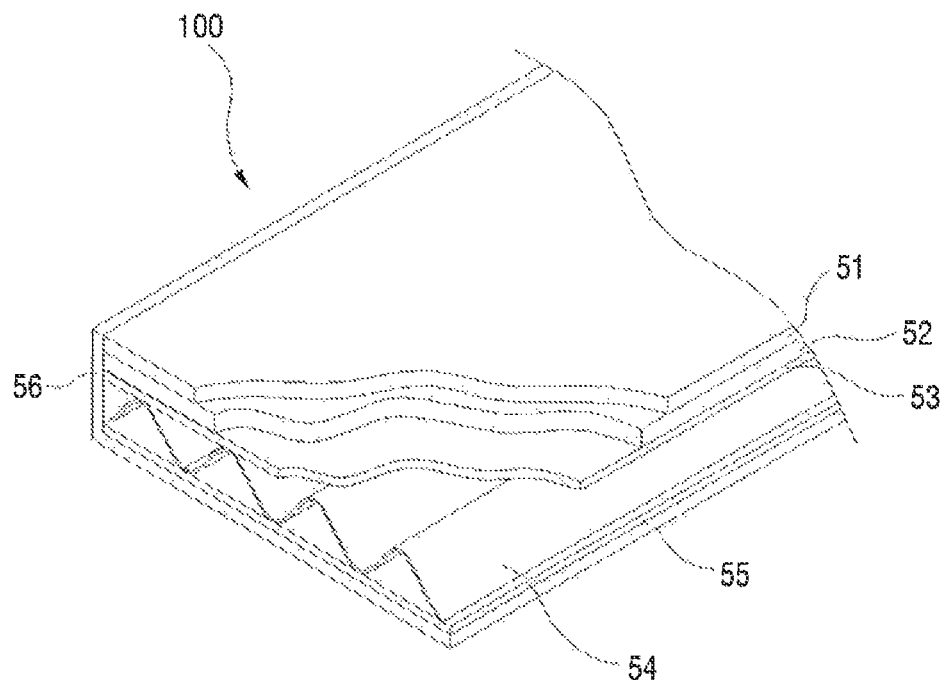
FIG. 13 is a perspective view of a solar cell module according to an embodiment of the present invention.
Figure 14:
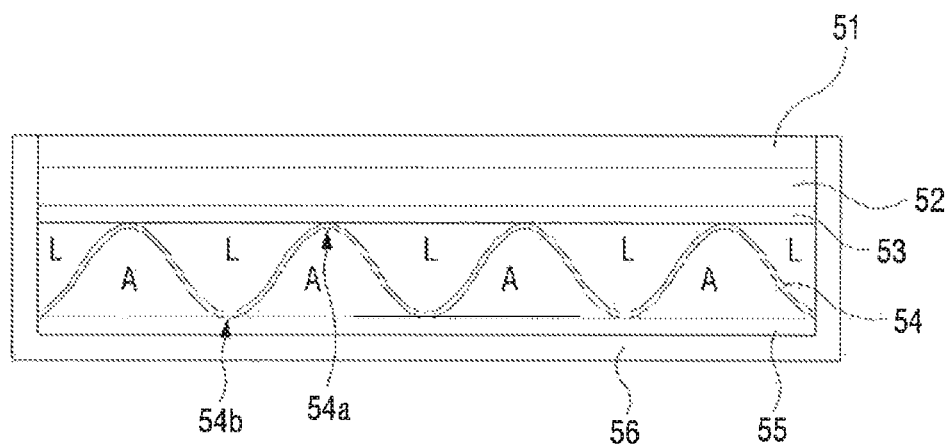
FIG. 14 is a cross-sectional view of the solar cell module of FIG. 13.
Figure 15:
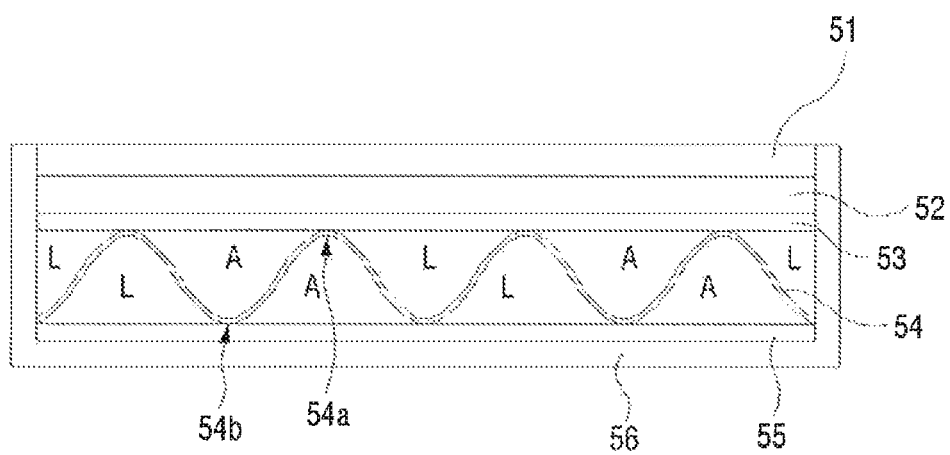
FIG. 15 is a cross-sectional view of a solar cell module according to another embodiment of the present invention.

FIGS. 13 and 14 are a perspective view and a cross-sectional view of the solar cell module 100 according to an embodiment of the present invention, and FIG. 15 is a cross-sectional view of the solar cell module 100 according to another embodiment of the present invention.

Referring to FIGS. 13 and 14, the solar cell module 100 according to the present invention is formed by mounting a photoelectric layer 52, a thermal conduction layer 53 and an insulating layer 55 on a housing 56. The photoelectric layer 52 is a region in which a plurality of solar cells are formed. The photoelectric layer 52 generates electricity using radiated light.

A cover glass 51 is formed on the entire surface of the photoelectric layer 52, physically protects the photoelectric layer 52 and improves heat collection efficiency. The thermal conduction layer 53 is used to diffuse heat generated in the photoelectric layer 52 toward the cooling pipes L and A, and is formed using a material having high thermal conductivity.

The cooling pipes L and A cool heat generated in the photoelectric layer 52 using a heating medium. In this case, the heated heating medium may be supplied to the heat storage tank 500 through the heat storage tank inlet pipe 441 and may be used for hot water or may be supplied to the heat pump 300 through the solar cell outlet pipe 421 and may be used for heating, as illustrated in FIG. 6. The heating medium may be a liquid heating medium or a gaseous heating medium, and a path of each heating medium in the cooling pipes L and A is classified by a partition member 54.

The partition member 54 has a bent shape in which a ridge 54*a* that contacts a bottom surface of the thermal conduction layer 53 and a valley 54*b* that contacts a top surface of the insulating layer 55 are formed. Thus, the cooling pipes L and A for the path of each heating medium are formed along lengthwise directions of the ridge 54*a* and the valley 54*b* of the partition member 54.

The ridge 54*a* and the valley 54*b* are formed in the plural form, and the cooling pipes L and A defined by the partition member 54 are also formed in the plural form. In this case, a plurality of cooling pipes L and A may include cooling pipes L through which the liquid heating medium passes, and cooling pipes A through which the gaseous heating medium passes. For example, each cooling pipe L having one surface that contacts the thermal conduction layer 53 may be used so that the liquid heating medium may pass through the cooling pipe L, and each cooling pipe A having one surface that contacts the insulating layer 55 may be used so that the gaseous heating medium may pass through the cooling pipe A. In this case, the first heating medium that is the heat source side heating medium may be a gaseous heating medium, and the second heating medium that flows through the heat storage tank 500 may be a liquid heating medium.

As described above, although the thermal conduction layer 53 is provided between the photoelectric layer 52 and the cooling pipes L and A, the cooling pipes L and A may be provided between the photoelectric layer 52 and the insulating layer 55 without the thermal conduction layer 53.

Also, as illustrated in FIG. 15, the cooling pipes L each having one surface that contacts the thermal conduction layer 53 and the cooling pipes A each having one surface that contacts the insulating layer 55 may be configured in such a way that the cooling pipes L through which the liquid heating medium passes and the cooling pipes A through which the gaseous heating medium passes may be alternately disposed.

In this way, the partition member 54 may be simply manufactured by forming one plate in a bent shape so that different heating mediums can constitute independent paths. As a result, construction can be easily performed. In particular, since different heating mediums can be used in the plurality of cooling pipes L and A formed by the partition member 54, heat transfer efficiency can be improved.

Figure 16:
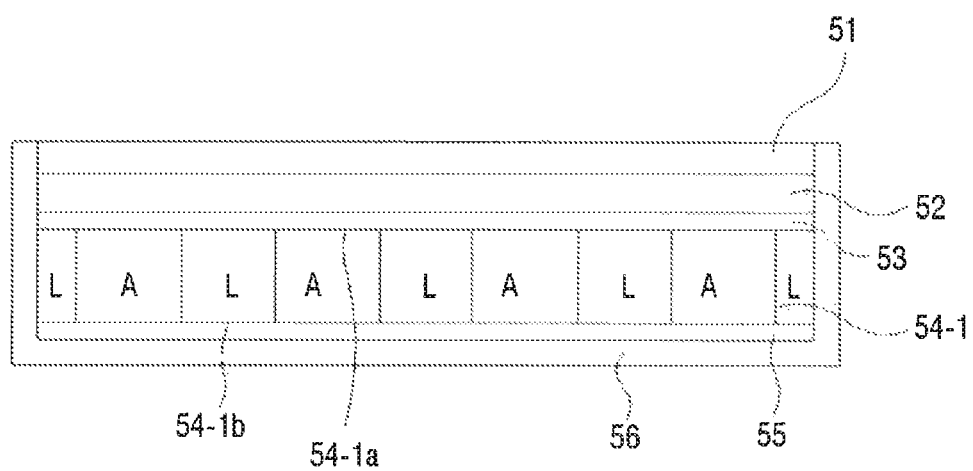
FIG. 16 is a cross-sectional view of a solar cell module according to another embodiment of the present invention.
Figure 17:
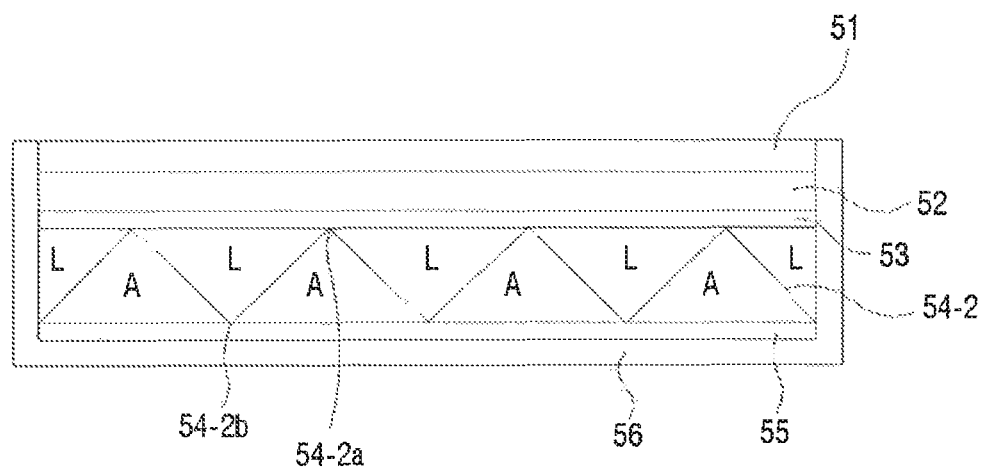
FIG. 17 is a cross-sectional view of a solar cell module according to another embodiment of the present invention.

FIGS. 16 and 17 are cross-sectional views of solar cell modules according to other embodiments of the present invention. As illustrated in FIG. 16, the partition member 54 may be bent so that a cross-section thereof may have a rectangular shape in which both sides of the cooling pipe L through which the liquid heating medium passes and the cooling pipe A through which the gaseous heating medium passes, may contact the thermal conduction layer 53 and the insulating layer 55. Also, as illustrated in FIG. 17, the partition member 54 may be bent so that a cross-section thereof may have a sawtooth shape. When the partition member 54 is formed to have the above-described shapes, the partition member 54 can be easily manufactured compared to the embodiments of FIGS. 14 and 15.

Figure 18:
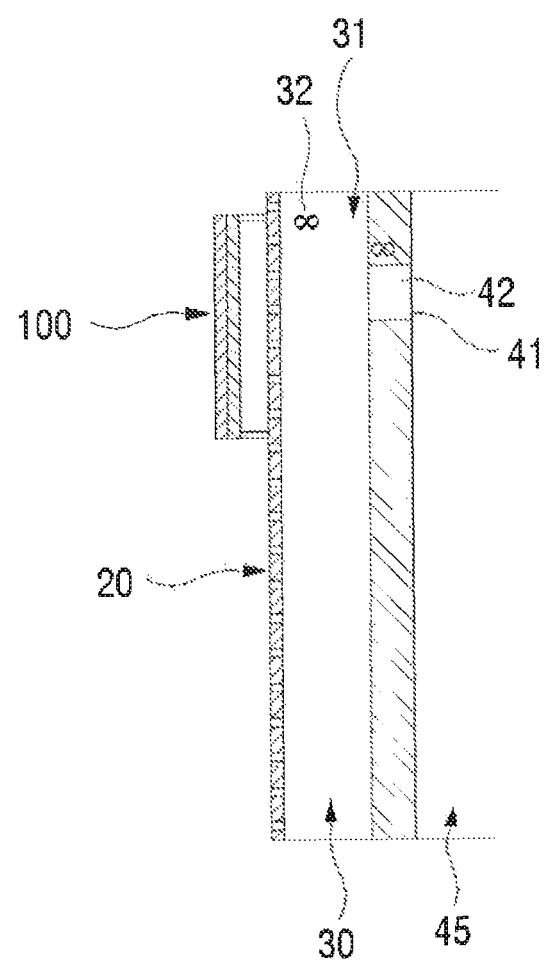
FIGS. 18 through 20 illustrate a heat-electricity combined production system according to other embodiments of the present invention.
Figure 19:
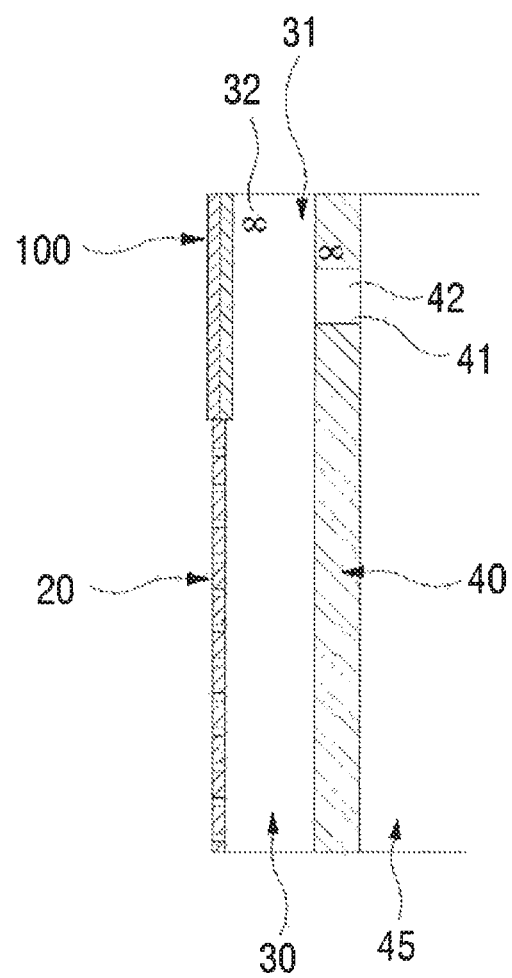

FIGS. 18 and 19 illustrate other embodiments in which the solar cell module 100 is combined with a heat-electricity combined production system.

As illustrated in FIG. 18, the solar cell module 100 may be combined with the heat collectors 20 while being spaced apart therefrom by a predetermined gap so that efficiency can be prevented from being lowered by heat of the heat collectors 20.

Also, the solar cell module 100 may be mounted between openings formed in the heat collectors 20, as illustrated in FIG. 19.

Figure 20:
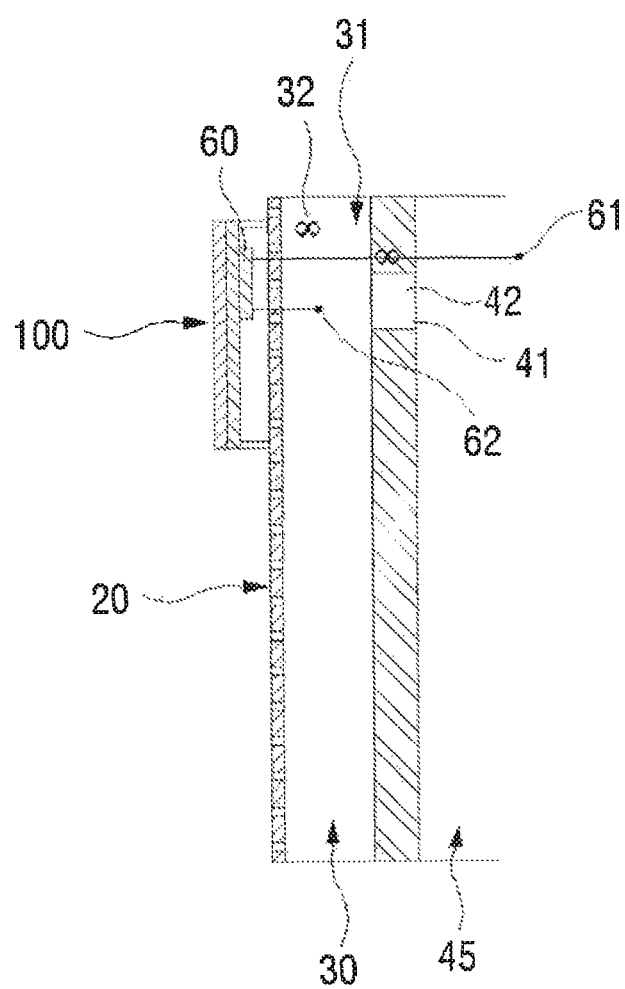

FIG. 20 illustrates a heat-electricity combined production system to which a controller 60 is added. The controller 60 is installed at a rear side of the solar cell module 100 and is connected to a first temperature sensor 61 disposed in the interior 45 and a second temperature sensor 62 disposed in the separation space 30. The controller 60 controls the blower fan 42 and the discharge fan 32 to be selectively driven depending on temperatures detected by the first and second temperature sensors 61 and 62.

Figure 21:
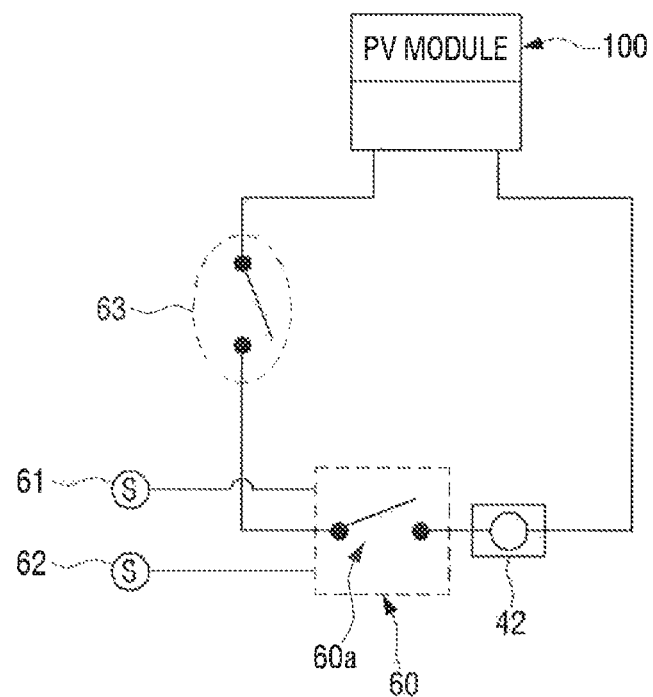
FIGS. 21 through 23 illustrate operating states of elements of the heat-electricity combined production system illustrated in FIGS. 18 through 20.

FIG. 21 illustrates an operating state of the controller 60 connected to the blower fan 42 according to the present invention.

Referring to FIG. 21, the controller 60 includes a first control switch 60a for controlling the blower fan 42 and is connected to the first and second temperature sensors 61 and 62. The first control switch 60a is connected between a main switch 63 and the blower fan 42 and is turned on or turned off by control of the controller 60. The main switch 63 is used to control an operation of the solar cell module 100 and is manually manipulated.

The controller 60 controls a switching operation of the first control switch 60a for driving the blower fan 42 depending on temperatures detected by the first and second temperature sensors 61 and 62. For example, when the temperature of the separation space 30 detected by the second temperature sensor 62 is 5° C. or more higher than the temperature of the interior 45 detected by the first temperature sensor 61 and indoor temperature is equal to or less than 25° C., the controller 60 may turn on the first control switch 60a so that the blower fan 42 may be driven by power supplied to the blower fan 42.

Figure 22:
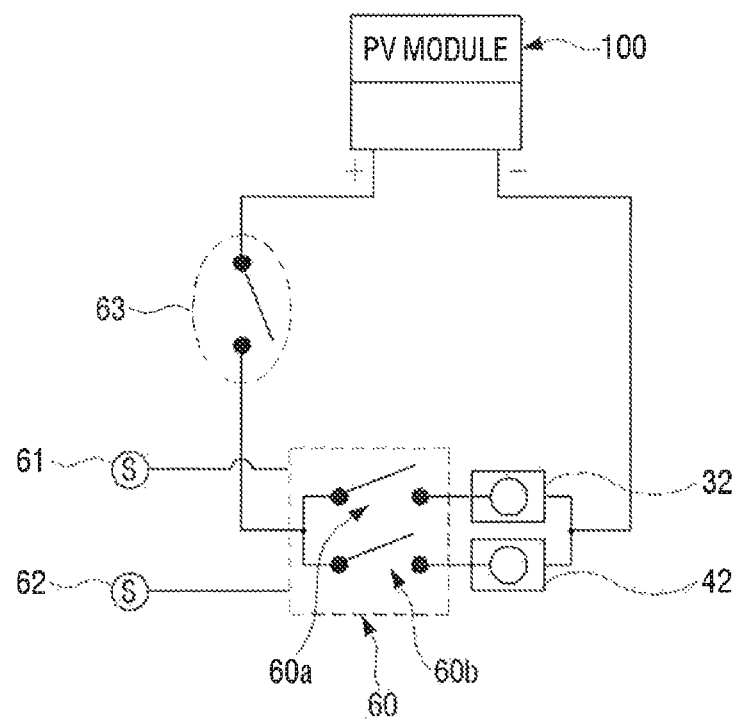

FIG. 22 illustrates an operating state of the controller 60 connected to the blower fan 42 and the discharge hole 31.

Referring to FIG. 22, the controller 60 includes first and second control switches 60a and 60b and is connected to the first and second temperature sensors 62 and 62. In this case, the first and second control switches 60a and 60b are used to control operations of the blower fan 42 and the discharge fan 32 according to control instructions of the controller 60. For example, the controller 60 may turn on the second control switch 60b so as to drive the discharge fan 32 when the temperature detected by the second temperature sensor 62 installed in the separation space 30 is equal to or greater than 30° C.

Driving of the discharge fan 32 is performed to prevent external high-temperature heat from being transferred to the interior 45 due to heat-exchange between the separation space 30 that is an exterior and the interior 45. When outdoor temperature is high temperature of 30° C. or more, it is assumed that the interior 45 is cooled.

For example, when the interior 45 is being cooled and the temperature of the separation space 30 adjacent to the outer wall 40 is high temperature, the high temperature of the separation space 30 is conducted to the interior 45 and causes a rise of the temperature of the interior 45 being cooled, thereby lowering energy efficiency of the interior 45. In order to improve this problem, when outdoor temperature is high temperature, the controller 60 discharges high-temperature air of the separation space 30 so that the temperature of a region that contacts the outer wall 40 is not maintained at a high temperature.

Figure 23:
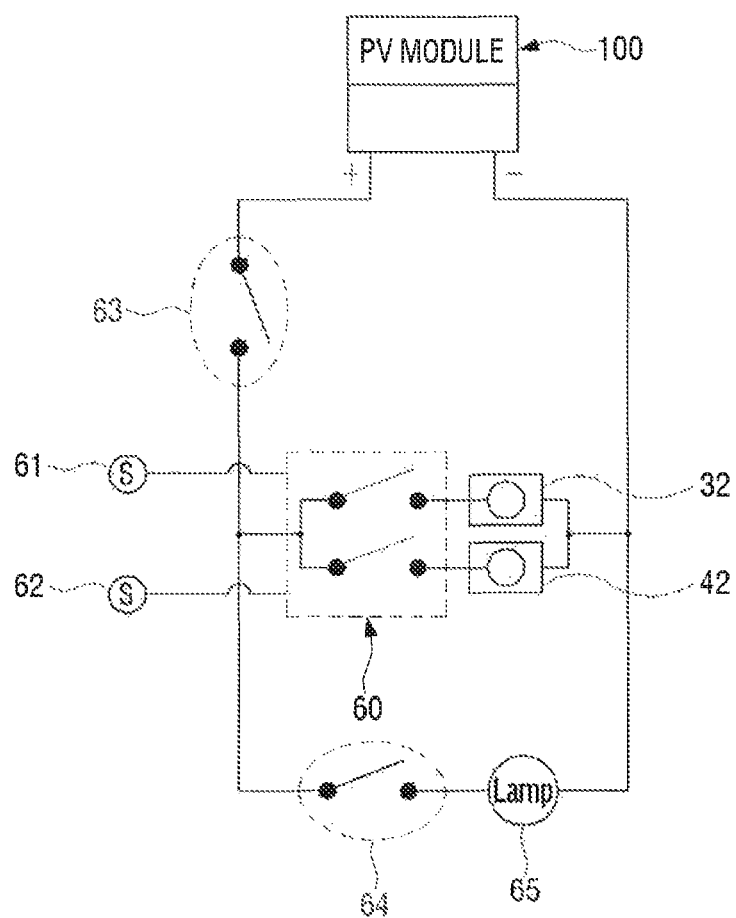

Also, in the current embodiment of the present invention, as illustrated in FIG. 23, a lamp 65 that is turned on/off by an auxiliary switch 64 switched by manual manipulation may be added. In addition, in the current embodiment of the present invention, a capacitor (not shown) may be further installed so as to store electricity generated in the daytime at which the amount of radiation is high, and so as to use electricity at night.

As described above, in a heat-electricity combined production system according to the present invention, air is heated by heat collectors at a predetermined temperature when outdoor air flows so that energy required for indoor heating can be reduced. Also, since a solar cell module is used to generate driving power of a blower fan used to flow air, the supply of additional power is not required so that the problem of conveniences of installing equipment for power supply at an existing building can be improved.

As described above, according to the one or more embodiment of the present invention, electricity and heat can be produced by implementing a structure that fuses solar light, solar heat and geothermal heat so that energy efficiency can be improved. Also, a heating medium absorbs both solar heat and geothermal heat and then flows into a geothermal heat pump so that thermal efficiency can be improved and a load to be applied to a compressor of the geothermal heat pump can be reduced. In addition, a system can be implemented with low costs by using air as the heating medium.

In addition, cooling pipes that may use two or more different heating mediums using a simple structure can be formed so that heat of a photoelectric cell layer can be efficiently cooled and thus the efficiency of photoelectric cells can be improved.

Furthermore, an outdoor air heating system that can be driven without no additional supply of power using a solar cell module can be provided, and exterior materials installed at an outer wall of a building can be replaced with the outdoor air heating system, and heat collectors and the solar cell module are integrally implemented so that construction costs can be reduced.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A heat-electricity combined production system using solar energy, the system comprising:
    a solar cell module in which a flow path through which a heat source side heating medium heated by solar heat flows, is formed and which generates electricity by solar light;
    a geothermal heat exchanger that absorbs geothermal heat through the heat source side heating medium;
    a heat pump comprising a heat source side heat exchanger that performs heat-exchange between the heat source side heating medium and a refrigerant and a load side heat exchanger that performs heat-exchange between the refrigerant and a load side heating medium;
    a controller that transfers the heat source side heating medium having temperature fallen due to heat-exchange performed by the heat source side heat exchanger so as to selectively pass through the solar cell module or the geothermal heat exchanger or to pass through both the solar cell module and the geothermal heat exchanger; and
    a plurality of pipes that connect the solar cell module, the geothermal heat exchanger and the heat pump so that the heat source side heating medium is able to flow through the plurality of pipes,
    wherein a path on which the heat source side heating medium is circulated, comprises solar cell circulation paths that circulate the heat source side heat exchanger and the solar cell module, geothermal heat circulation paths that circulate the heat source side heat exchanger and the geothermal heat exchanger, and combined circulation paths that circulate the heat source side heat exchanger, the solar cell module and the geothermal heat exchanger.

2. The system of claim 1, wherein an external condition determination unit for determining an external condition is provided at the controller, and the heat source side heating medium circulates one from among the solar cell circulation paths, the geothermal heat circulation paths and the combined circulation paths based on a determination result of the external condition determination unit.

3. The system of claim 2, wherein pipes that constitute the solar cell circulation paths, the geothermal heat circulation paths and the combined circulation paths comprise a heat pump inlet pipe connected to the heat source side heat exchanger in such a way that the heat source side heating medium flows into the heat source side heat exchanger, a heat pump outlet pipe connected to the heat source side heat exchanger in such a way that the heat source side heating medium flows out from the heat source side heat exchanger, a solar cell inlet pipe diverged from the heat pump outlet pipe and connected to the solar cell module, a solar cell outlet pipe connected to the solar cell module in such a way that the heat source side heating medium flowing into the solar cell module flows out and flows into the heat pump inlet pipe, a geothermal heat inlet pipe diverged from the heat pump outlet pipe and connected to the geothermal heat exchanger, a geothermal heat outlet pipe connected to the geothermal heat exchanger in such a way that the heat source side heating medium flowing out from the geothermal heat exchanger flows into the heat pump inlet pipe, and a first connection pipe that allows the heat source side heating medium flowing out through the solar cell outlet pipe to flow into the geothermal heat exchanger through the geothermal heat inlet pipe, and
    wherein a first flow path conversion unit installed at a point where the heat pump outlet pipe, the solar cell inlet pipe and the geothermal heat inlet pipe cross one another, and a third flow path conversion unit installed at a point where the solar cell outlet pipe and the first connection pipe cross each other, are provided.

4. The system of claim 3, wherein a second connection pipe is provided between the solar cell outlet pipe and the heat pump inlet pipe, and a second flow path conversion unit is further provided at a point where the geothermal heat outlet pipe, the second connection pipe and the heat pump inlet pipe cross one another.

5. The system of claim 2, wherein pipes that constitute the solar cell circulation paths, the geothermal heat circulation paths and the combined circulation paths comprise a heat pump inlet pipe connected to the heat source side heat exchanger in such a way that the heat source side heating medium flows into the heat source side heat exchanger, a heat pump outlet pipe connected to the heat source side heat exchanger in such a way that the heat source side heating medium flows out from the heat source side heat exchanger, a solar cell inlet pipe diverged from the heat pump outlet pipe and connected to the solar cell module, a solar cell outlet pipe connected to the solar cell module in such a way that the heat source side heating medium flowing into the solar cell module flows out and flows into the heat pump inlet pipe, a geothermal heat inlet pipe diverged from the heat pump outlet pipe and connected to the geothermal heat exchanger, a geothermal heat outlet pipe connected to the geothermal heat exchanger in such a way that the heat source side heating medium flowing out from the geothermal heat exchanger flows into the heat pump inlet pipe, a third connection pipe that connects the geothermal heat outlet pipe, the solar cell outlet pipe and the heat pump inlet pipe, and a fourth connection pipe that connects the heat pump outlet pipe and the solar cell inlet pipe, and
    wherein a fourth flow path conversion unit installed at a point where the heat pump outlet pipe, the fourth connection pipe and the geothermal heat inlet pipe cross one another, a fifth flow path conversion unit installed at a point where the solar cell outlet pipe, the heat pump inlet pipe and the third connection pipe cross each other, and a sixth flow path conversion unit installed at a point where the third connection pipe, the solar cell inlet pipe, the geothermal heat outlet pipe and the fourth connection pipe cross one another, are provided.

6. The system of claim 2, wherein the external condition is one or more from among outdoor air temperature, time, and the amount of solar radiation, and when the outdoor air temperature is equal to or less than a setting temperature and simultaneously the amount of solar radiation is equal to or less than a setting amount, the heat source side heating medium circulates the combined circulation paths, thereby absorbing both solar heat and geothermal heat.

7. The system of claim 2, wherein a heat storage tank configured to store heat of the heat source side heating medium heated by the solar cell module is provided, and heat of the heat storage tank is used for hot water.

8. The system of claim 1, wherein the heat pump module is driven using electricity produced in the solar cell module.

9. The system of claim 1, wherein the solar cell module comprises:
   a photoelectric layer comprising a solar cell;
   an insulating layer that faces the photoelectric layer while being spaced apart from the photoelectric layer by a predetermined gap; and
   a partition member configured to divide a region between the photoelectric layer and the insulating layer into two or more cooling pipes, and
   wherein the partition member has a bent shape in which a ridge that contacts a bottom surface of the photoelectric layer and a valley that contacts a top surface of the insulating layer are formed.

10. The system of claim 9, wherein a plurality of cooling pipes defined by the partition member are configured so that cooling pipes through which a gaseous heating medium flows and cooling pipes through which a liquid heating medium flows, are alternately formed.

11. A heat-electricity combined production system using solar energy, the system comprising:
   heat collectors installed to be spaced apart from an outer wall of a building by a predetermined gap;
   a solar cell module installed at one side of the heat collectors, through which a heat source side heating medium heated by solar heat flows and which generates electricity by solar light;
   an inlet hole through which air in a separation space between the outer wall and the heat collectors flows into an interior and which is formed in a top end of the outer wall;
   a blower fan installed at the inlet hole and connected to the solar cell module;
   a geothermal heat exchanger that absorbs geothermal heat through the heat source side heating medium;
   a heat pump comprising a heat source side heat exchanger that performs heat-exchange between the heat source side heating medium and a refrigerant and a load side heat exchanger that performs heat-exchange between the refrigerant and a load side heating medium;
   a controller that transfers the heat source side heating medium having temperature fallen due to heat-exchange performed by the heat source side heat exchanger so as to selectively pass through the solar cell module or the geothermal heat exchanger or to pass through both the solar cell module and the geothermal heat exchanger; and
   a plurality of pipes that connect the solar cell module, the geothermal heat exchanger and the heat pump so that the heat source side heating medium is able to flow through the plurality of pipes.

12. The system of claim 11, wherein the solar cell module comprises two or more cooling pipes differentiated by a partition member interposed between a photoelectric layer and an insulating layer and having a bent shape in which a ridge and a valley are formed.

13. The system of claim 11, wherein the solar cell module comprises two or more cooling pipes differentiated by a partition member interposed between the photoelectric layer and the insulating layer and having a rectangular cross-section and including top and bottom ends each having a predetermined width.

14. The system of claim 11, wherein the solar cell module comprises two or more cooling pipes differentiated by a partition member interposed between the photoelectric layer and the insulating layer and having a triangular cross-section and including upper and lower vertexes.

15. The system of claim 11, wherein a partition member that is interposed between the photoelectric layer and the insulating layer and constitutes two or more cooling pipes that differentiate from each other, is provided at the solar cell module, and
   the cooling pipes defined by the partition member are configured in such a way that cooling pipes through which a liquid heating medium passes and cooling pipes through which a gaseous heating medium passes, are alternately formed.

16. The system of claim 11, wherein the heat collectors and the solar cell module are integrated with each other.

17. The system of claim 11, wherein a partition member that is interposed between the photoelectric layer and the insulating layer and constitutes two or more cooling pipes through which a liquid heating medium and a gaseous heating medium flow respectively, is provided at the solar cell module, and
   cooling pipes through which the liquid heating medium passes and cooling pipes through which the gaseous heating medium passes, are provided at the photoelectric layer so as to contact alternately.

18. The system of claim 11, wherein the heat collectors comprise through holes through which outdoor air flows into the separation space.

* * * * *